May 28, 1963

C. C. GEBHARDT 3,091,761

SECTOR SCAN CONTROL APPARATUS

Filed Aug. 12, 1960

INVENTOR.
CARL C. GEBHARDT,
BY Robert H. Himes
ATTORNEY

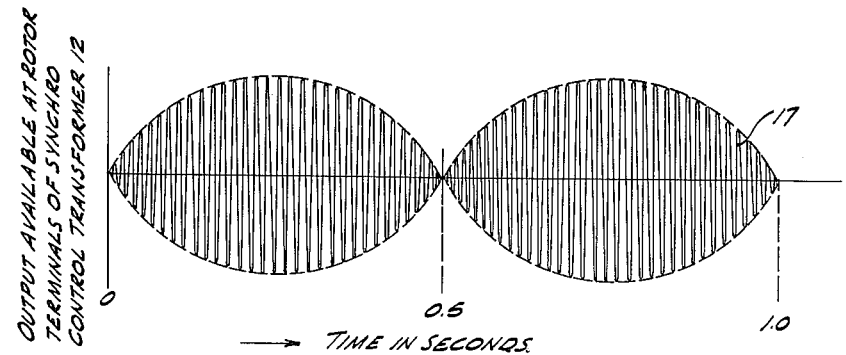
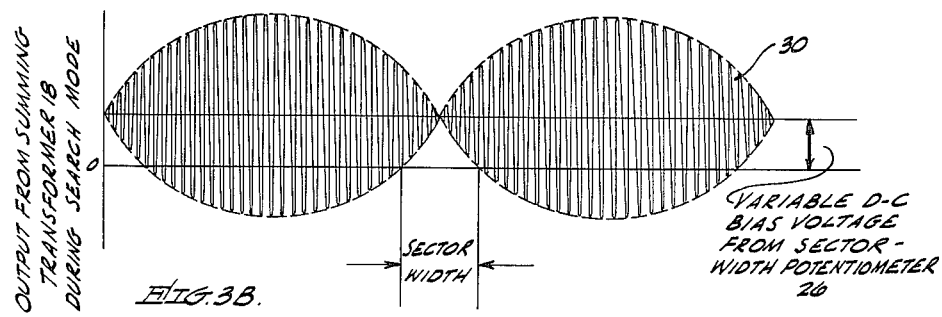
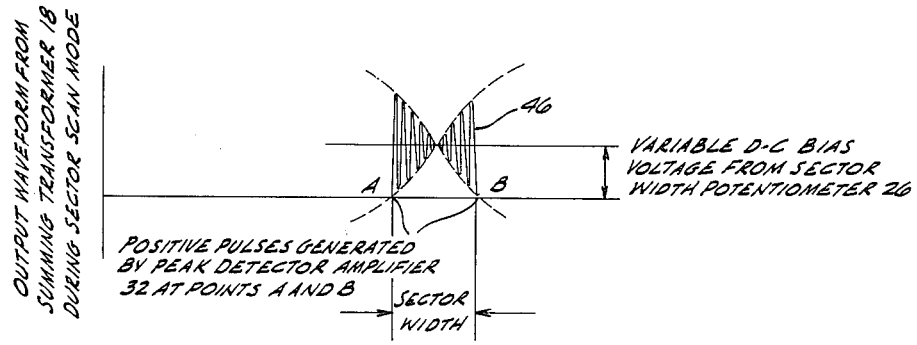

3,091,761
SECTOR SCAN CONTROL APPARATUS
Carl C. Gebhardt, Garden Grove, Calif., assignor to Hughes Aircraft Company, Culver City, Calif., a corporation of Delaware
Filed Aug. 12, 1960, Ser. No. 49,389
5 Claims. (Cl. 343—7.4)

This invention relates to a sector scan control apparatus for a search radar system wherein a sector center may be electronically selected at any point within 360° of antenna rotation and the width of the sector may be independently varied electronically from a few degrees to substantially 180°.

One present day technique of accomplishing mechanical sectoring of an antenna is to control the azimuthal motion of an antenna by means of a power servomechanism, such as an amplidyne drive system. The power servomechanism in turn is slaved to an instrument servo at the radar operator's control panel. In sector scan mode, the instrument servo functions as a velocity servo which rotates at constant speed and turns a synchro or other type of transducer to generate an error signal which is continually minimized by the antenna power servo. The motor of the instrument servo also operates a cam which trips a switch at each extremity of the desired sector. The tripping of the switch reverses connections to the instrument servo motor and to the tachometer generator which causes the motor to rotate at constant speed in the reverse direction. The power servo which rotates the antenna follows until the switch at the other side of the desired sector is tripped at which time the reversing action takes place again. A disadvantage of this type of system is that for any large radar system it is generally desirable to have several positions from which the operation of the radar may be monitored and controlled. When this is the case, an instrument servo is required at each control position which, in addition to requiring space that is usually at a premium, is also uneconomical.

It is therefore an object of the present invention to provide an improved sector scan control apparatus for a search radar system.

Another object of the present invention is to provide a sector scan control apparatus which does not require the use of instrument servos or limit switches.

Still another object of the present invention is to provide a sector scan control apparatus wherein the sector edges are sensed electronically.

In accordance with the present invention, the sector is positioned by selecting a sector center by means of a reference synchro and the width thereof set by a potentiometer. When the edge of a sector is sensed, a relay is caused to operate in a manner to reverse connections to a power control element such as, for example, a hydraulic servo valve, and to the antenna speed sensing device such as a direct-current tachometer generator. In operation, the sector sensing circuit compares the output of a synchro control transformer, the rotor of which is positioned by the antenna, with a selected portion of a D.C. reference voltage. The greater the portion of the reference voltage, the greater the sector width. When the entire amount of D.C. reference voltage is used, the maximum sector width which is achieved is approximately 180°. The output of the control transformer varies as the sine of the angle between the antenna and the sector center. A peak detector circuit generates an input to each of two logical "and" or coincidence circuits when the control transformer output just slightly exceeds the D.C. reference voltage. Concurrently, the synchro control transformer produces an output which is applied to a phase sensitive rectifier which in turn feeds a cathode coupled paraphase amplifier. Each of the two outputs of the paraphase amplifier is applied to one of the "and" gates. Since the two outputs of the paraphase amplifier are of opposite phase, only one of the two "and" gates can have an output when the second input is received from the peak detector. The information level output signal from the "and" gate activates a relay amplifier which in turn energizes a bipolar relay that reverses the connections to the power velocity servo and thus reverses the direction of rotation of the antenna back towards the sector center. The peak detector only generates an output signal at the edge of the sector being scanned. Accordingly, lockdown circuits are employed on the bipolar relay to insure that the connections to the velocity servo remain unchanged until the other edge of the sector being scanned is reached by the antenna.

The above-mentioned and other features and objects of this invention and the manner of obtaining them will become more apparent by reference to the following description taken in conjunction with the accompanying drawings, wherein:

FIG. 3 illustrates waveforms generated by the synchro control transformer and the sector width reference voltage of the apparatus shown in FIG. 1.

Figure 1:
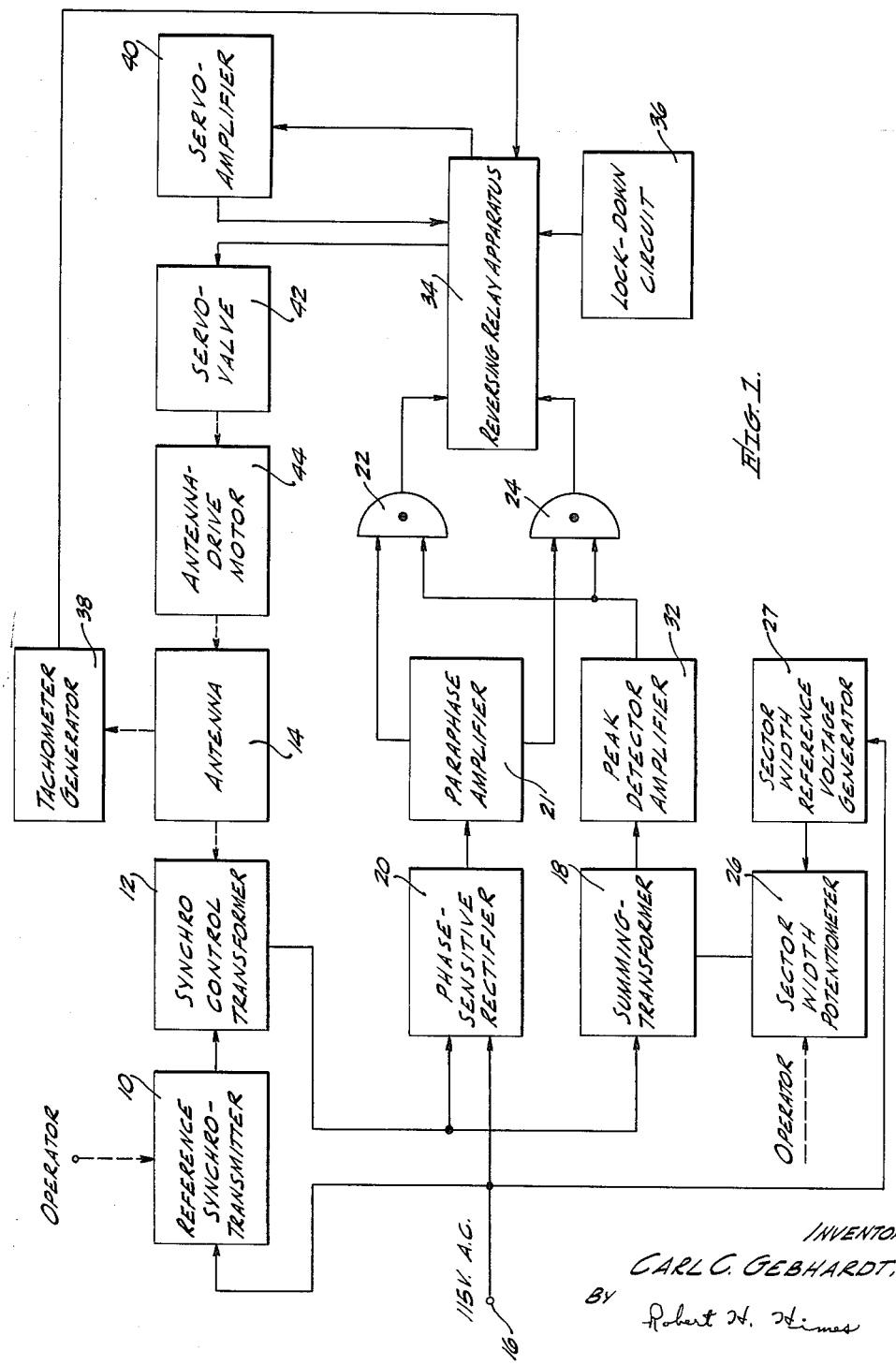
FIG. 1 illustrates a schematic block diagram of a preferred embodiment of the present invention.

Referring now to FIG. 1 of the drawing there is shown a preferred embodiment of the present invention wherein a reference synchro transmitter 10 and a synchro control transformer 12 operates together to produce a signal indicative of the angular position of an antenna 14 relative to a reference selected by a radar operator. More particularly, both the reference synchro transmitter 10 and the synchro control transformer 12 each include a single-phase winding on a rotor and three Y-connected symmetrically spaced windings on a stator. The orientation of the rotor of the reference synchro transmitter 10 is positioned by the radar operator and the winding thereon energized from a 115 volt 60 cycle per second source 16 whereby three signals are induced in the Y-connected stator winding which have relative magnitudes and polarities that uniquely define the angular position of its rotor with respect to its stator. The rotor of the synchro control transformer 12, on the other hand, is mechanically attached to and thus oriented by the antenna 14 and the three Y-connected windings of its stator connected to corresponding windings of the stator of reference synchro transmitter 10. Thus, when the three stator windings of synchro control transformer 12 are energized with voltages which define an angle, a voltage is developed on the rotor winding of a magnitude that is proportional to the sine of the angular difference between this angle and the antenna 14. In addition, this voltage experiences a 180° change in phase for angular differences taken in opposite directions from zero degrees, i.e., the angle at which the antenna 14 is in alignment with the angle uniquely defined by the voltages generated by the stator windings of reference synchro transmitter 10. Referring to FIG. 3A, there is shown a voltage waveform 17 that would be developed at the terminals of the rotor of synchro control transformer 12 when the antenna 14 is rotating at the uniform angular velocity of one revolution per second.

Referring again to FIG. 1, the rotor winding of synchro control transformer 12 is connected to both a summing transformer 18 and to a phase sensitive rectifier 20 which also receives an input from the 115 volts 60 cycle source 16. The phase sensitive detector generates an output signal of an amplitude comparable to that of the output signal developed by the synchro control transformer 12 and of a polarity indicative of the orientation of the antenna 14 relative to that of the rotor of reference synchro transmitter 10. The output signal from the phase sensitive rectifier 20 is applied to a paraphase amplifier 21 which in turn develops comparable output signals of opposite phase which are connected to the respective inputs of "and" gates 22, 24.

The summing transformer 18, in addition to receiving an input signal from the synchro control transformer 12, also has an adjustable direct-current voltage applied to the secondary winding thereof from a sector width potentiometer 26. The potentiometer 26 is adjusted by the radar operator to select the sector width desired as will be hereinafter described. Also, the direct-current reference voltage applied across the sector width potentiometer 26 is rectified directly from the alternating-current voltage available from source 16 by means of a sector width reference voltage generator 27. Thus, in the event of any fluctuations in the alternating-current voltage available at source 16, the reference voltage applied across the potentiometer 26 will vary proportionately with the output signal developed by the synchro control transformer 12. An illustration of the signal developed at the output of summing transformer 18 when the radar system is not in the sector scan mode is shown as voltage waveform 30 in FIG. 3B.

The voltage waveform 30 developed at the output terminal of the summing transformer 18 is applied to the input of a peak detector and amplifier 32 which develops an output pulse of positive polarity only when voltage waveform 30 has excursions that are negative with respect to ground. In operation, the sector width potentiometer 26 is adjusted by the radar operator so that the interval between the envelope of voltage waveform 17 at zero volts conforms to the sector width desired. Thus, positive pulses are developed by the peak detector amplifier 32 at the instant the antenna 14 reaches the edge of the sector being scanned. The positive pulses developed at the output of peak detector amplifier 32 are applied to inputs of both "and" gates 22 and 24. The "and" gates 22, 24 are of the diode and pull-down resistor type wherein the output voltage level remains essentially at the level of the more negative input. Thus, one input may become positive but the output will remain unchanged until the second input becomes more positive at which time the output will follow and assume the level of the more negative of the two inputs.

Thus during the sector scan mode of operation, one of the "and" gates 22 or 24 is "armed" dependent on the side of the sector center that the antenna 14 is on. Subsequent occurrence of the positive pulse developed at the edge of the sector by peak detector amplifier 32 appears at the output of the armed "and" gate 22 or 24 and is applied to a reversing relay apparatus 34 to cause it to change state. In that only an output is produced by peak detector amplifier 32 at the edge of the sector being scanned, a lock-down circuit 36 is employed to maintain the reversing relay apparatus 34 energized until the opposite edge of the sector is reached by the antenna 14. A change in the state of reversing relay apparatus 34 reverses the connections between a direct-current tachometer generator 38, which is mechanically connected to the antenna 14, and the input of a servo-amplifier 40 and, in addition, reverses connections between the output of servo-amplifier 40 and a servo-valve 42 which in turn reverses the energization applied to an antenna-drive motor 44 which is mechanically connected to and rotates the antenna 14. Lastly, inasmuch as the antenna 14 only rotates back and forth through the sector being scanned, only corresponding portions of the waveform 30 will appear at the input of peak detector amplifier 32. This portion of waveform 30 designated as voltage waveform 46 is shown in FIG. 3C.

Figure 2:
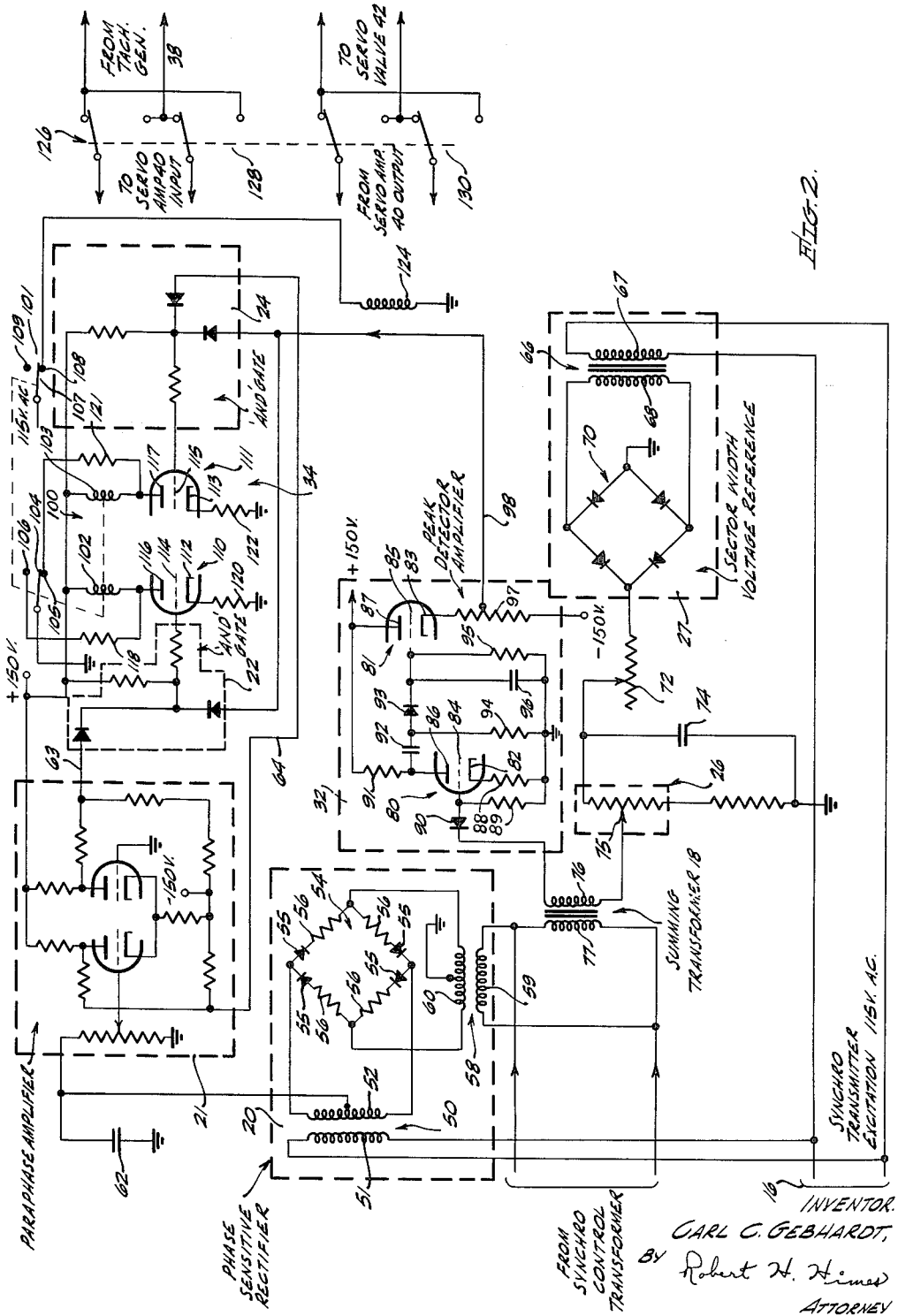
FIG. 2 illustrates a schematic circuit diagram of a portion of the apparatus of FIG. 1.

Referring to FIG. 2, there is shown a schematic circuit diagram of an embodiment of the electronic portions of the apparatus of FIG. 1. In particular, the phase sensitive rectifier 20 includes a transformer 50 having a primary winding 51 connected to the source 16 of alternating-current potential and a center-tapped secondary winding 52 connected across opposite junctions of a resistor-diode bridge network 54. Each branch of the bridge network 54 includes a diode 55 connected in series with a resistor 56. The diodes 55 are poled to allow current to flow in a clock-wise direction, as shown in the drawing. Lastly, the phase sensitive rectifier 20 includes a transformer 58 having a primary winding 59 connected across the rotor winding of the synchro control transformer 12 and a center-tapped secondary winding 60 connected across the remaining opposite terminals of the bridge network 54 and the center-tap thereof connected to ground. In operation, the alternating-current signal from synchro control transformer 12 will either be zero or in phase or out of phase with the 115 volt alternating-current potential available at source 16. In any of these cases, a direct-current output signal of an amplitude proportional to the amplitude of the output signal from the synchro control transformer 12 and of a polarity dependent on the phase relations of the potentials applied to transformers 50, 58 is produced at the center-tap of the secondary winding 52 of transformer 50.

The output signal thus produced on the center-tap of winding 52 is smoothed by a shunting capacitor 62 and applied to the input of the paraphase amplifier 21 which may be of any conventional type. Paraphase amplifier 21 produces output signals of opposite polarities on the leads 63, 64 which are connected to inputs of the "and" gates 22, 24, respectively.

The sector width voltage reference generator 27 is provided by a transformer 66 having a primary winding 67 connected to the source 16 of alternating-current potential and a secondary winding 68 connected across opposite junctions of a bridge rectifier circuit 70. Of the remaining opposite terminals of bridge rectifier circuit 70, one terminal is connected to ground and the other terminal is connected through an adjustable resistor 72 across the sector-width potentiometer 26 and a capacitor 74. An adjustable tap 75 of the sector width potentiometer 26 is connected to one extremity of a secondary winding 76 of the summing transformer 18, the remaining extremity of which is connected to the input of peak detector amplifier 32. Summing transformer 18 also includes a primary winding 77 which is responsive to the output voltage waveform 17 generated by the synchro control transformer 12. The net result is that the direct-current bias available at the adjustable tap 75 is added to the voltage waveform 17 produced by the synchro control transformer 12 to produce the voltage waveform 30 which is applied to the peak detector amplifier 32.

The peak detector amplifier 32 includes triode tubes 80, 81 having cathode 82, 83, control grids 84, 85 and plates 86, 87, respectively. The cathode 82 of tube 80 is connected through a resistor 88 to ground; the control grid 84 of tube 80 is connected through a grid leak resistor 89 to ground and through a diode 90 to the remaining extremity of secondary winding 76 of summing transformer 18, which diode 90 is poled to allow current to flow away from control grid 84; and plate 86 of tube 80 is connected through a load resistor 91 to a regulated source of direct-current potential of the order of +150 volts relative to ground. In addition, plate 86 of tube 80 is coupled through a capacitor 92 and a diode 93 in the order named to the control grid 85 of tube 81, the diode 93 being poled to allow current flow twoards the control grid 85. Further, the junction between capacitor 92 and diode 93 is connected through a resistor 94 to ground and the control grid 85 is connected to ground through a grid-leak resistor 95 which is, in turn, by-passed with a capacitor 96. Lastly, the plate 87 of tube 81 is connected directly to the regulated source of direct-current potential and the cathode 83 is connected through a load resistor 97 to a negative regulated source of direct-current potential. A lead 98 from an intermediate junction of the load resistor 97 provides the output from the peak detector amplifier 32. In operation, the diode 90 prevents any signal from being applied to the control grid 84 of tube 80 until there is a negative excursion with respect to ground which occurs at points A and B of voltage waveform 46, FIG. 3C. The negative excursions at points A and B of voltage waveform 46 generate positive pulses on output lead 93 which is connected to inputs of both "and" gates 22 and 24. As will be hereinafter explained in more detail, these positive pulses effect the reversal of antenna 14 at the points corresponding to A and B whereby the antenna 14 together with synchro control transformer 12 discontinues the search phase corresponding to the waveforms of FIGS. 3A and 3B. Thus, the synchro control transformer 12 generates only the portions of voltage waveform 30 intermediate points A and B. The voltage waveform 46, FIG. 3C, results. Adjustment of the tap 75 of sector width potentiometer 26 raises or lowers the voltage waveform 30 relative to zero volts or ground and hence controls the width of a sector from substantially zero degrees to 180°. As previously specified, the maximum width of a sector is substantially 180°. Inasmuch as the envelope of the waveform generated by synchro control transformer 12 has a sine wave configuration, the width between points A and B of waveform 46 is a function of the sine of the angle between appropriate reference points on the rotor of the reference synchro transmitter 10 and the rotor of the synchro control transformer 12, i.e., the sine of the angle between the center-line of the sector and the edge of the sector desired to be scanned. For example, sine 90°=1 corresponds to a sector width of 180° and sine 30°=0.5 corresponds to a sector width of 60°. Thus, changes in the variable D.-C. bias voltage provided by the sector width potentiometer 26 does not produce linear changes in sector width. This non-linearity, however, can be minimized for the operator by employing an appropriate non-linear potentiometer for potentiometer 26.

The positive pulses generated on the lead 98 by the peak detector amplifier 32 are applied to both of the "and" gates 22, 24, the outputs of which are, in turn, applied to the reversing relay apparatus 34. The reversing relay apparatus 34 includes a bipolar relay 100 which has a double-pole, double-throw switch 101 and solenoid coils 102, 103. The double-pole, double-throw switch 101 includes a movable arm 104 with associated contacts 105, 106, and a movable arm 107 with contacts 108 and 109. The movable arms 104, 107 make contact simultaneously with the contacts 105, 108 and with the contacts 106, 109. The movable arm 104 is connected to ground and the movable arm 107 is connected to a 115 volt source of alternating-current potential (not shown). The coils 102, 103 are connected from the source of direct-current potential of the order of +150 volts with respect to ground to triode tubes 110, 111 which include cathodes 112, 113, control grids 114, 115 and plates 116, 117, respectively. In particular, the plate 116 of tube 110 is connected to the coil 102 and through a lock-down resistor 118 to the contact 106 of the bipolar relay 100. Also, the control grid 114 of tube 110 is connected to the output of the "and" gate 22 and the cathode 112 is connected through a resistor 120 to ground. Similarly, the plate 117 of tube 111 is connected to the coil 103 and through a lock-down resistor 121 to the contact 105 of the double-pole, double-throw switch 101 of bipolar relay 100. Also, the control grid 115 of tube 111 is connected to the output of "and" gate 24 and the cathode 113 is connected through a resistor 122 to ground. Lastly, the contact 108 of double-pole, double-throw switch 101 is connected to one extremity of a coil 124 of a relay 126, the remaining extremity of which is connected to ground. The relay 126 includes reversing contacts 128 which reverse the connections from the tachometer generator 38 to the input of servo-amplifier 40 and reversing contacts 130 which reverse the connections between the servo-amplifier 40 output and the servo-valve 42.

In operation, the outputs of the "and" gates normally remain at substantially ground potential. The appearance of a positive pulse on the lead 98 from peak detector amplifier 32 appears on the output of the "and" gate 22 or 24 on which the remaining input is maintained at information level by the paraphase amplifier 21. The appearance of this positive pulse on control grid 114 of tube 110, for example, allows current to flow through the coil 102 of bipolar relay 100. The energization of coil 102 closes the double-pole, double-throw switch 101 in a manner such that movable arm 104 makes electrical contact with contact 106 and movable arm 107 makes electrical contact with contact 109. Thus, current flows from the source of direct-current potential serially through the coil 102 and lock-down resistor 118 to contact 106, and movable arm 104 to ground. Subsequent to the appearance of the positive pulse on lead 98, little or no current flows through the tube 110. The coil 102 of reversing relay 100, however, will remain energized because of current flow through the lock-down resistor 118. Also, since the contact 108 of the switch 101 remains "floating" the reversing contacts 128, 130 of relay 126 will remain in the state corresponding to the de-energized condition of coil 124 thereof.

Subsequent appearance of a positive pulse on lead 98 will appear at the output of "and" gate 24 thereby to cause current to flow through tube 111 and energize coil 103 of reversing relay 100. Current flow through coil 103 causes movable arm 104 to break contact with contact 106 and make contact with contact 105, thus de-energizing coil 102 and completing the lock-down circuit through lock-down resistor 121 of coil 103. Further, energization of coil 103 causes movable arm 107 to make contact with contact 108 thus applying excitation to the coil 124 of relay 126. Energization of relay 126 reverses the connections between the tachometer generator 38 and the input to the servo amplifier 40 and between the output of servo-amplifier 40 and the servo-valve 42. Reversal of these connections reverses the direction of rotation of the antenna 14. Since the positive pulses appear only at the edge of the sector which it is desired to scan, it is evident that the direction of rotation of the antenna 14 is reversed every time the edge of the sector is reached.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. In a radar system having a rotating antenna adapted to direct exploratory pulses in a plane passing through the axis of rotation of said antenna and having a fixed direction with respect to said antenna, an apparatus for controlling the scanning of a predetermined sector comprising means responsive to a reference alternating-current signal and mechanically coupled to said antenna for developing a first signal of a phase that is the same as that of said reference signal on one side of a radial line defining the center of said sector and that is of opposite phase on the remaining side thereof and of an amplitude that is a function of the angular distance from said radial line; means for producing a second signal that is of a unidirectional polarity and of an amplitude corresponding to the width of said sector; means responsive to said first and second signals for producing successive voltage indications when said first and second signals are of corresponding amplitudes; means responsive to said reference signal and said first signal for producing a third signal that is at information level when said exploratory pulses are on one side of said radial line and a fourth signal that is at information level when said exploratory pulses are on the other side thereof; means for producing a fifth signal that is the conjunction of said successive voltage indications and said third signal; means for producing a sixth signal that is the conjunction of said successive voltage indications and said fourth signal; and means responsive to said fifth and sixth signals for successively reversing the direction of rotation of said antenna substantially at the time of occurrence of said successive voltage indications thereby to cause said antenna to scan said predetermined sector.

2. In a radar system having a rotating antenna adapted to direct exploratory pulses in a plane passing through the axis of rotation of said antenna and having a fixed direction with respect to said antenna, the apparatus for controlling the scanning of a predetermined sector as defined in claim 1 wherein said means responsive to said reference alternating-current signal and mechanically coupled to said antenna for developing a first signal includes a reference synchro transmitter responsive to said reference alternating-current signal for producing seventh, eighth and ninth signals which uniquely define the direction of said radial line; and a synchro control transformer mechanically coupled to said antenna and responsive to said seventh, eighth and ninth signals for developing said first signal.

3. In a radar system having a rotating antenna adapted to direct exploratory pulses in a plane passing through the axis of rotation of said antenna and having a fixed direction with respect to said antenna, the apparatus for controlling the scanning of a predetermined sector as defined in claim 1 wherein said means responsive to said reference signal and said first signal for producing said third and fourth signals includes a phase sensitive rectifier.

4. In a radar system having a rotating antenna adapted to direct exploratory pulses in a plane passing through the axis of rotation of said antenna and having a fixed direction with respect to said antenna, the apparatus for controlling the scanning of a predetermined sector as defined in claim 1 wherein said means responsive to said first and second signals for producing successive voltage indications when said first and second signals are of substantially the same amplitude includes a summing transformer responsive to said first and second signals for producing a composite waveform thereof and a peak detector responsive to said composite waveform for producing said successive voltage indications when said composite waveform is coincident with a substantially fixed reference potential level.

5. In a radar system having a rotating antenna adapted to direct exploratory pulses in a fixed azimuthal direction relative to said antenna, an apparatus for controlling the scanning of a predetermined sector comprising a reference synchro transmitter responsive to a reference alternating-current signal for producing first, second and third signals which uniquely define a selected direction; a synchro control transformer responsive to said first, second and third signals and mechanically coupled to said antenna for generating a fourth signal of a phase that is the same as that of said reference signal on one side of said selected direction and that is of opposite phase on the other side thereof and that is of an amplitude that is proportional to the sine of the angle between the direction of said exploratory pulses and said selected direction; means for generating an adjustable direct-current potential of an amplitude corresponding to the desired width of said predetermined sector; means including a peak detector amplifier responsive to said adjustable direct-current potential and said fourth signal for producing successive voltage indications when said fourth signal and said adjustable direct-current potential are of corresponding amplitudes; means including a phase sensitive rectifier responsive to said reference alternating-current signal and said fourth signal for producing a fifth signal that is at information level when said exploratory pulses are on the side of said selected direction and a sixth signal that is at information level when said exploratory pulses are on the other side thereof; a first "and" gate responsive to said successive voltage indications and said fifth signal for producing a seventh signal that is the conjunction of the input signals thereto; a second "and" gate responsive to said successive voltage indications and said sixth signal for producing an eighth signal that is the conjunction of the input signals thereto; and means responsive to said seventh and eighth signals and including a bipolar relay for successively reversing the direction of rotation of said antenna substantially at the time of occurrence of said successive voltage indications thereby to cause said antenna to rotate towards said selected direction whereby said predetermined sector is scanned by said exploratory pulses.

References Cited in the file of this patent
UNITED STATES PATENTS

| | | |
|---|---|---|
| 2,547,363 | Bishop | Apr. 3, 1951 |
| 2,648,038 | Morse et al. | Aug. 4, 1953 |
| 2,724,113 | Lentz | Nov. 15, 1955 |